United States Patent [19]
Zosel

[11] 4,331,695
[45] May 25, 1982

[54] PRODUCTION OF FATS AND OILS FROM VEGETABLE AND ANIMAL PRODUCTS

[75] Inventor: Kurt Zosel, Oberhausen, Fed. Rep. of Germany

[73] Assignee: Studiengesellschaft Kohle mbH, Mülheim, Fed. Rep. of Germany

[21] Appl. No.: 769,326

[22] Filed: Feb. 16, 1977

Related U.S. Application Data

[63] Continuation of Ser. No. 658,658, Feb. 17, 1976, abandoned, which is a continuation of Ser. No. 452,485, Mar. 18, 1974, abandoned, which is a continuation-in-part of Ser. No. 424,241, Dec. 12, 1973, abandoned.

[30] Foreign Application Priority Data

Dec. 22, 1972 [AT] Austria ............................... 10999/72

[51] Int. Cl.³ .......................... A23L 1/20; C09F 5/02; C11B 1/10
[52] U.S. Cl. .................................... 426/430; 426/417; 426/429; 260/412.4; 260/412.8
[58] Field of Search ............... 426/427, 429, 430, 417; 260/412.4, 412.8

[56] References Cited

U.S. PATENT DOCUMENTS

| | | | |
|---|---|---|---|
| 2,548,434 | 4/1951 | Leaders | 260/412.4 |
| 2,560,935 | 7/1951 | Dickinson | 260/412.4 |
| 2,682,551 | 6/1954 | Miller | 260/412.8 |
| 3,843,824 | 10/1974 | Roselins et al. | 426/427 X |
| 3,939,281 | 2/1976 | Schwengers | 426/429 X |

*Primary Examiner*—David M. Naff
*Attorney, Agent, or Firm*—McAulay, Fields, Fisher, Goldstein & Nissen

[57] ABSTRACT

Fats or oils are extracted from animal or vegetable products by a process of contacting the product with a solvent in the liquid phase and at a temperature below the critical temperature of the solvent to extract fat or oil from the product, separating the solvent containing extracted fat or oil from the residue of the product, and precipitating the extracted fat or oil from the solvent by heating the solvent to above the critical temperature of the solvent without taking up heat of vaporization. The resultant precipitated fat or oil contains no more than 3 ppm of solvent which makes the fat or oil suitable for use in foodstuffs without further processing to remove solvent. The temperatures of the solvent may be 0°–100° C. during extraction and 50°–200° C. during precipitation, and the pressure may be the same during extraction and precipitation.

21 Claims, 1 Drawing Figure

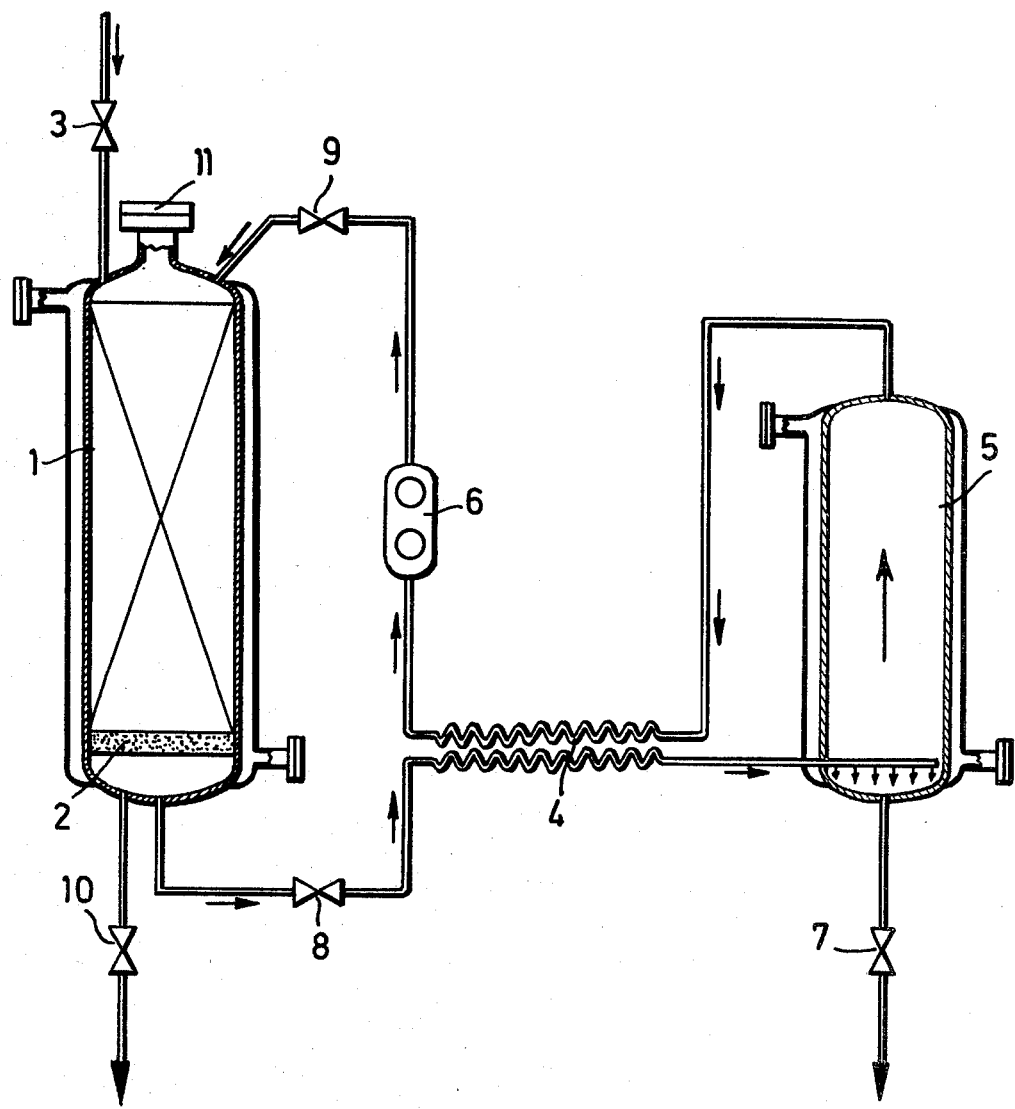

PRODUCTION OF FATS AND OILS FROM VEGETABLE AND ANIMAL PRODUCTS

This is a continuation of Ser. No. 658,658 filed Feb. 17, 1976, now abandoned, which was a continuation of Ser. No. 452,485 filed Mar. 18, 1974, now abandoned, which was a continuation-in-part of Ser. No. 424,241 filed Dec. 12, 1973, now abandoned.

Today's most important technical processes for the production of fats and oils from vegetable and animal products, such as oil seeds and oil fruits, are pressing, extraction, extraction by boiling and re-steeping.

The extraction with solvents which are liquid at room temperature and atmospheric pressure is the process which hitherto has been most productive, but nevertheless also the most costly both as regards equipment and also as regards the energy consumed. The advantage of the recovery of oil (glycerides) by extraction consists particularly in that, in practice, the oil is completely removed from the oil seeds. Consequently, it is the extraction process which is preferably used with initial substances having a low oil or fat content. For starting raw materials with a high oil content, the treatment with solvents is less suitable, since naturally in this case large quantities of solvents are used and have to be recovered. In such a case, the main quantity of the oil is obtained by previous pressing of the fruits. The press residues are thereafter subjected to a solvent extraction. Practically only hexane-heptane mixtures with boiling limits from 65° to 98° C. are used as solvents in the art, if it is intended to employ oils and fats for food purposes.

The separation of vegetable oils is at the present day effected, for example, largely by extraction of the comminuted oil seeds and oil-containing parts of the plants. The solvent which is enriched with oil during the extraction passes through filter presses or usually simple pot filters and has to be separated in a distillation plant into oil and pure solvent, which returns into the process. For this purpose, there are used either multi-stage circulation evaporators or continuously operating columns, which are charged from above with the extraction solution and in which the oil emerges from the discharge union after a steam treatment. With this separation stage, it is necessary to apply all the heat of evaporation of the solvent. The extraction residues (shreds) are treated for removing any remaining solvent, either by blowing on direct steam or by indirect heating in a worm system and subsequent direct steaming. The loss of solvent amounts to about 0.5 to 2%. It is only in this way that residues are obtained which are to be used as feeding stuffs. The relatively high boiling ranges of the extraction agents to be normally employed make difficult the best possible quantitative removal of final traces of foreign solvents.

The law concerning foodstuffs prescribes that not more than 3 ppm of solvent may be contained in the oil. It is not possible to satisfy this requirement solely by the aforementioned distillation, but only by a subsequent treatment with superheated steam.

A process for production of fats and oils from vegetable and animal products comprising extracting the product with a solvent having solvent power for the glyceride which increases with increasing density of the solvent, and the density of which can be varied by varying the temperature or pressure, by contacting the solvent with the product at a temperature and pressure and for a time sufficient for extraction of glyceride by the solvent, separating the solvent containing extracted glyceride from the residual product, precipitating glyceride from the solvent containing extracted glyceride obtained by the step before by varying at least one of the temperature and pressure to reduce the density and thereby the solvent power of the solvent for the glyceride.

Using the new process for extracting fats and oils with suitable solvents, the precipitation of the oil and fat is effected in an extremely simple and technically practical manner without using heat of evaporation, and the previously discussed processing step of heating up and steam treatment of the extraction residue can now be left out. The legal requirements in respect of residual solvent content of the extraction residue are met already after the last step. Furthermore, the new process is also suitable for starting materials with high oil content without previous pressing.

Suitable solvents for the process according to the invention are those of which the density in the temperature range from 0° to 200° C. is capable of being varied by change of temperature or pressure in wide limits, for example 0.7 to 0.03 g/cc., that is to say, by a magnitude of about 10:1. Especially suitable in this respect are substances which are gaseous at room temperature and atmospheric pressure and the density of which can be increased by compression almost to the density of conventional solvents, as for example hexane (0.66 g/cc.). This condition is advantageously fulfilled by propane, ethane, carbon dioxide and dinitrogenoxide, but butane and isobutane are also to be considered. Because of the danger of effects which are injurious to health, low-boiling, unsaturated or halogenated hydrocarbons which would also satisfy the condition as referred to above should not be employed as far as possible.

In the development of the process according to the invention, it was found that the said substances not only have a good dissolving power for triglycerides under pressure, but in addition are also applicable, already at low temperatures, advantageously between 15° and 80° C. to almost completely dissolve out oils and fats from comminuted plant or animal portions, such as copra shreds, soya flakes, ground corn grains, oil seeds, and many others, or such as bones.

The process according to the invention is suitably carried out in such a way that the products to be extracted are treated under pressure with the solvents at temperatures from 0° to 100° C., preferably from 15° to 80° C. The pressure in this operation should be as high as the density of the solvent is sufficient to guarantee a high dissolving power. The preferred pressure generally applied should be the critical pressure of the solvent ±5 to 10 atm. Vegetable fats or oils are for example dissolved very satisfactorily in propane from 10° to 80° C. and 40 to 50 atm (density: about 0.5 to 0.4 g/cc.). The solution thus obtained is thereafter heated at this pressure to temperatures of 50°–200° C., which has to be sufficiently high so that no evaporation involving heat of evaporation occurs, and the quantitative separation according to the invention is obtained. When using propane, heating is applied to about 110° to 160° C. In this operation, the density of the solvent, e.g. of the propane, which is under constant pressure decreases as much (density: about 0.25 to 0.08 g/cc), as the fat or oil which is taken up precipitates.

Contrary to the conventional processes, no heat of evaporation has to be used in this extraction or separating process. All of the heat which is necessary for heating up the solvent containing extracted fat and oil is supplied in the form of sensible heat which, after separation into oil and solvent has taken place, is largely delivered again in a heat exchanger to further solution containing extract which is to be heated up and in this way is recovered.

With all processes which make use of a vaporisation process, the heat of vaporisation of the solvent is of course recovered in the form of its heat of condensation; however, it can only be utilized for heating up further solution, but not for vaporising the solvent.

The process according to the invention thus makes it possible for the solvent extraction to be carried out in a particularly simple manner and consequently, in many respects, in a particularly advantageous and especially inexpensive form. It consists more preferred in that the extraction and the separating out of the extracted oil or fat is undertaken isobarically in a closed solvent cycle between the extraction step and the precipitation step, the operation in the extractor taking place at low temperature and high density and the operation in the separator at high temperature and low density of the solvent, while exclusively sensible heat is exchanged.

An additional advantage of the process according to the invention consists in that, as solvents, substances having a low molecular weight are used, which diffuse particularly easily through the cell membranes and hence make possible the discharge of the fats and oils in a particularly advantageous manner. Furthermore, any last parts of these highly volatile solvents can be removed without any difficulty after the separation as described above.

With the preferred embodiment of the process according to the invention, the solvent is conducted in a cycle with minimum consumption of energy because of constant pressure. The process is extremely gently, so that there is no occurence of denaturization phenomena on the material being extracted and this material, as well as more particularly the extraction residue, can be directly further exploited, for example, as feeding stuffs.

Naturally, the process of this extraction and separation of the extraction agent can also be carried out with utilization of heat of vaporization, i.e. by vaporizing the solvent which is used. In this case, the particularly favourable energy balance is lost, but the other advantages of the process according to the invention as referred to above are maintained.

The process is to be more fully explained by reference to the flow diagram.

Disposed in the extractor 1 is the product from which oil is to be extracted, for example, soya flakes. It rests on the filter plate 2. The extractor 1 is heated by a heating jacket to about 80° C. The apparatus is now filled through the inlet valve 3 with propane up to a pressure of about 42 atm. The extractor 1 is directly connected at the bottom end by way of heat exchanger 4 to the lower part of the pressure separator 5. This pressure separator is heated by a heating jacket to about 130° C. The top of the pressure separator 5 is in turn directly connected by way of heat exchanger 4 and a gearwheel circulating pump 6 to the head of the extractor 1.

The circulating pump 6 is now set in operation and it maintains a closed circulation of propane. In a high density state the propane flows through the extractor 1 and hence through the product from which oil is to be extracted and in a low density state through a pressure separator 5. The change in density is effected in the heat exchanger 4. The oil which precipitates with the heating of the propane solution is collected on the bottom of the pressure container 5 and is continuously drawn off through the valve 7.

After extraction has been completed, the propane is drawn off from the extractor 1 through the valve 10 with the valves 8 and 9 closed. The propane is preferably delivered through a suitable refilling device directly into a second extractor (not shown in the flow diagram) which is connected in parallel and is already charged with product from which oil is to be extracted. After removal of the propane, the residue (shreds) from which oil has been extracted, is for example pneumatically emptied from the extractor 1 through the filling union 11.

The shredded material contains practically no more solvent because of the extremely low boiling point of the solvent. It is not necessary to use a steam extraction of the shreds or waste, such as it is when using hexane-heptane mixtures as solvents.

Thus, the invention provides for the production of fat and oil glyceride from a vegetable or animal product. According to the invention, the glyceride can be extracted from the product by contacting of the solvent, which is in liquid phase, with the fat or glyceride. In the extraction step, the temperature is below the critical temperature of the solvent. Following the extraction, the solvent containing the fat or oil dissolved therein, is separated from any residue of the vegetable or animal product. The precipitation step is then performed. For the precipitation, the solvent containing the dissolved fat or oil is heated to above the critical temperature of the solvent. That causes a separation in which the precipitate forms a heavy phase, and the solvent goes overhead as a supercritical gaseous phase.

A number of vegetable and animal products were treated in the apparatus as described and in accordance with the procedure as described.

EXAMPLE 1

7.0 kg of soya flakes were extracted with propane.
Temperature in the extractor: 80° C.
Temperature in the separator: 130° C.
Pressure: 42 atm.
About 1365 g of oil were obtained.
The residual fat content in the residue was about 0.4%. Extraction time 25 minutes.

EXAMPLE 2

7.0 kg of soya flakes were extracted with propane.
Temperature in the extractor: 20° C.
Temperature in the separator: 140° C.
Pressure: 42 atm.
About 1360 g of oil were obtained.
The residual fat content of the residue was about 0.57%. Extraction time 30 minutes.

EXAMPLE 3

7.0 kg of soya flakes were extracted with ethane.
Temperature in the extractor: 20° C.
Temperature in the separator: 80° C.
Pressure: 48 atm.
About 1360 g of oil were obtained.
The residual fat content of the residue was about 1.1%. Extraction time 4 hours.

EXAMPLE 4

7.0 kg of soya flakes were extracted with carbon dioxide.
Temperature in the extractor: 18° C.
Temperature in the separator: 80° C.
Pressure: 73 atm.
About 1350 g of oil were obtained.
The residual fat content of the residue was about 1.9%. Extraction time 5 hours.

EXAMPLE 5

7.0 kg of soya flakes were extracted with $N_2O$.
Temperature in the extractor: 20° C.
Temperature in the separator: 75° C.
Pressure: 72 atm.
About 1360 g of oil were obtained.
The residual fat content of the residue was about 0.9%. Extraction time 2½ hours.

EXAMPLE 6

6.0 kg of ground maize were extracted with propane.
Temperature in the extractor: 80° C.
Temperature in the separator: 130° C.
Pressure: 42 atm.
About 235 g of oil were obtained.
The residual fat content of the residue was about 0.1%. Extraction time 30 minutes.

EXAMPLE 7

7.5 kg of ground bones were extracted with isobutane.
Temperature in the extractor: 120° C.
Temperature in the separator: 180° C.
Pressure: 37 atm.
About 940 g oil were obtained.
The residual fat content of the residue was about 0.4%. Extraction time 30 minutes.

In the same manner and with similar results, it is possible to extract: comminuted peanuts; sunflower seeds; copra shreds; olives; olive kernels; linseed and cottonseed.

In the latter case, a cottonseed oil is obtained which has a lower content of gossypol, a toxic by-product, than an oil which was obtained by pressing.

What is claimed is:

1. Process for production of fat and oil glyceride from a vegetable or animal product wherein said product is separated into glyceride and a residue, comprising:
   (a) contacting the product with a solvent having solvent power for the glyceride to dissolve the glyceride and leave said residue, at a temperature below the critical temperature of the solvent, and with the solvent in liquid phase,
   (b) separating solvent containing extracted glyceride from the residue,
   (c) precipitating glyceride from the solvent containing extracted glyceride obtained in step (b) by heating the solvent containing extracted glyceride to above the critical temperature of the solvent, without heat of vaporization being taken up, wherein the temperature for the extraction is 0°–100° C., and for the precipitation the temperature is 50°–200° C. and the pressure is constant.

2. Process according to claim 1, wherein the solvent is circulated between the extraction step and the precipitation step, and the solvent from the precipitation and the solvent containing extracted glyceride are passed countercurrent in a heat exchanger between said steps for heating of the solvent containing extracted glyceride and cooling of the solvent.

3. Process according to claim 1, wherein the solvent is ethane, propane, butane, isobutane, carbon dioxide or dinitrogen oxide.

4. Process according to claim 1, wherein the pressure is the same in the extraction step and the precipitation step.

5. Process for production of fat and oil glyceride from a vegetable or animal product wherein said product is separated into glyceride and a residue, comprising:
   (a) contacting the product with a solvent having solvent power for the glyceride to dissolve the glyceride and leave said residue, at a temperature below the critical temperature of the solvent, and with the solvent in liquid phase,
   (b) separating solvent containing extracted glyceride from the residue,
   (c) precipitating glyceride from the solvent containing extracted glyceride obtained in step (b) by heating the solvent containing extracted glyceride to above the critical temperature of the solvent, without heat of vaporization being taken up,
   wherein the pressure is the same in the extraction step and the precipitation step.

6. Process for production of fat and oil glyceride from a vegetable or animal product wherein said product is separated into glyceride and a residue, comprising:
   (a) contacting the product with a solvent having solvent power for the glyceride to dissolve the glyceride and leave said residue, at a temperature below the critical temperature of the solvent, and with the solvent in liquid phase,
   (b) separating solvent containing extracted glyceride from the residue,
   (c) precipitating glyceride from the solvent containing extracted glyceride obtained in step (b) by heating the solvent containing extracted glyceride to above the critical temperature of the solvent, without heat of vaporization being taken up,
   wherein the pressure in the precipitation step is the critical pressure of the solvent ±10 atm.

7. Process according to claim 6, wherein the pressure is the same in the extraction step and the precipitation step.

8. Process for production of fat and oil glyceride from a vegetable or animal product wherein said product is separated into glyceride and a residue, comprising:
   (a) contacting the product with a solvent having solvent power for the glyceride to dissolve the glyceride and leave said residue, at a temperature below the critical temperature of the solvent, and with the solvent in liquid phase,
   (b) separating solvent containing extracted glyceride from the residue,
   (c) precipitating glyceride from the solvent containing extracted glyceride obtained in step (b) by heating all of the solvent containing extracted glyceride to above the critical temperature of the solvent, without heat of vaporization being taken up, to provide a precipitated glyceride having no more than 3 ppm of said solvent.

9. Process according to claim 8, wherein said product is soya, maize, bone, peanut, sunflower seed, copra, olive, olive kernels, linseed or cottonseed.

10. Process of claim 8, wherein the solvent is circulated between the extraction step and the precipitation step.

11. Process according to claim 10, wherein the fat or oil content of the residue varies between 0.1 to 1.9%.

12. The process for degreasing vegetable matter containing starch and fats which comprises crushing said vegetable matter, extracting the crushed matter with a normally gaseous inert solvent in liquid state at a temperature below the critical temperature and at a pressure of the critical pressure, ±10 atmospheres, of the inert solvent, separating the fat-containing solvent from the substantially fat-free vegetable residue, separating the dissolved fat from the solvent by raising the temperature to vaporize the solvent, and reducing the pressure on the fat-free vegetable residue.

13. The process of claim 12 wherein the pressure during extraction is between 37 and 73 atmospheres.

14. The process of claim 12, wherein the solvent comprises at least one member selected from the group consisting of alkenes, halogenated alkanes, and $CO_2$.

15. The process of claim 14, where the solvent comprises $CO_2$.

16. The process for degreasing vegetable matter which comprises crushing said vegetable matter, extracting the crushed matter with a normally gaseous inert solvent in liquid state at a temperature of about 0° to 100° C. and below the critical temperature and at the critical pressure, ±10 atmospheres, of the inert solvent, separating the fat containing solvent from the substantially fat-free vegetable residue, separating the dissolved fat from the solvent by raising the temperature to vaporize the solvent, and reducing the pressure of the fat-free vegetable residue.

17. The process of claim 16 wherein the pressure is maintained from about 37 to about 73 atmospheres.

18. The process of claim 16 wherein during said extraction the normally gaseous inert solvent is in a liquid state at a temperature of about 10° to 80° C.

19. The process of claim 16 wherein the vegetable matter comprises cereal.

20. The process of claim 16 wherein the solvent comprises at least one member selected from the group consisting of alkenes, halogenated alkanes, and $CO_2$.

21. The process of claim 20, wherein the solvent comprises $CO_2$.

* * * * *